United States Patent
Sun

(10) Patent No.: US 8,652,018 B2
(45) Date of Patent: Feb. 18, 2014

(54) TOOL MAGAZINE

(76) Inventor: Ying Sun, Taichung (TW)

( * ) Notice: Subject to any disclaimer, the term of this patent is extended or adjusted under 35 U.S.C. 154(b) by 558 days.

(21) Appl. No.: 13/071,493

(22) Filed: Mar. 24, 2011

(65) Prior Publication Data

US 2012/0241342 A1    Sep. 27, 2012

(51) Int. Cl.
*B23Q 3/157* (2006.01)
(52) U.S. Cl.
USPC ............... 483/56; 483/57; 483/47; 483/62; 483/67
(58) Field of Classification Search
USPC ........... 483/42, 43, 47, 50, 54, 55, 56, 57, 62, 483/67, 39
See application file for complete search history.

(56) References Cited

U.S. PATENT DOCUMENTS

| | | | | |
|---|---|---|---|---|
| 4,069,918 A | * | 1/1978 | Inoue et al. | 483/62 |
| 4,135,278 A | * | 1/1979 | Kitamura | 483/39 |
| 4,394,908 A | * | 7/1983 | Pinchemaille | 483/62 |
| 4,835,838 A | * | 6/1989 | Hirose | 483/47 |
| 5,134,767 A | * | 8/1992 | Yasuda | 483/47 |
| 5,704,885 A | * | 1/1998 | Lee | 483/62 |
| 7,445,587 B2 | * | 11/2008 | Kojima et al. | 483/56 |
| 7,575,542 B1 | * | 8/2009 | Sun et al. | 483/39 |
| 7,578,776 B1 | * | 8/2009 | Sun et al. | 483/39 |

FOREIGN PATENT DOCUMENTS

| | | | | |
|---|---|---|---|---|
| JP | 03-221341 A | * | 9/1991 | |
| JP | 2002-355728 A | * | 12/2002 | |

* cited by examiner

*Primary Examiner* — Erica E Cadugan

(57) ABSTRACT

A machine tool is provided with a tool magazine including a guiding plate, a turntable and holders. The guiding plate includes an annular groove with a semi-circular section and a semi-oval section. The semi-circular section is defined by a radius. The semi-oval section is defined by a semi-major axis identical to the radius of the semi-circular section and a semi-minor axis shorter than the semi-major axis. The turntable includes claws extending from the periphery. Each of the holders is pivotally connected to a related one of the claws and includes an end for holding a tool and another end formed with a ball movably located in the annular groove. Thus, some of the holders of which the balls are located in the semi-circular section of the annular groove close while the other holders of which the balls are located in the semi-oval section of the annular groove open.

8 Claims, 5 Drawing Sheets

TOOL MAGAZINE

BACKGROUND OF INVENTION

1. Field of Invention

The present invention relates to a machine tool and, more particularly, to a machine tool equipped with a tool magazine for carrying a lot of tools and providing a lot of space for exchanging tools.

2. Related Prior Art

A tool machine such as a vertical lathe, a milling machine and a machining center includes similar tools with different sizes or different tools of different sizes. The tool machine generally includes a spindle for spinning an active one of the tools, a tool magazine for storing the tools, and a tool exchanger for exchanging the active tool with another tool. There is an on-going trend to store a large number of tools in the tool magazine.

The tool magazine includes holders each for holding a related one of the tools. To store a large number of tools, the volume of the tool magazine is made large or the number of holders is made large.

Where the volume of the tool magazine is made large, the tool magazine is inevitably made bulky and heavy and inevitably becomes a burden for the tool machine so that it is difficult to precisely position the tool magazine on the tool machine. Therefore, it is difficult to ensure precise machining with the tool machine.

Where the number of the holders is made large, the distance between two adjacent ones of the tools held by the holders is made small. The exchange of the active tool with another tool would be interfered with by adjacent tools. Hence, the related holders or the spindle would be tilted or deformed, and the operation of the machine tool would be affected.

The present invention is therefore intended to obviate or at least alleviate the problems encountered in prior art.

SUMMARY OF INVENTION

It is the primary objective of the present invention to provide a machine tool with a tool magazine of for carrying a lot of tools and providing a lot of space for exchanging tools.

To achieve the foregoing objective, the tool magazine includes a guiding plate, a turntable and holders. The guiding plate includes an annular groove with a semi-circular section and a semi-oval section. The semi-circular section is defined by a radius. The semi-oval section is defined by a semi-major axis identical to the radius of the semi-circular section and a semi-minor axis shorter than the semi-major axis. The turntable includes claws extending from the periphery. Each of the holders is pivotally connected to a related one of the claws and includes an end for holding a tool and another end formed with a ball movably located in the annular groove. Thus, some of the holders of which the balls are located in the semi-circular section of the annular groove close while the other holders of which the balls are located in the semi-oval section of the annular groove open.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
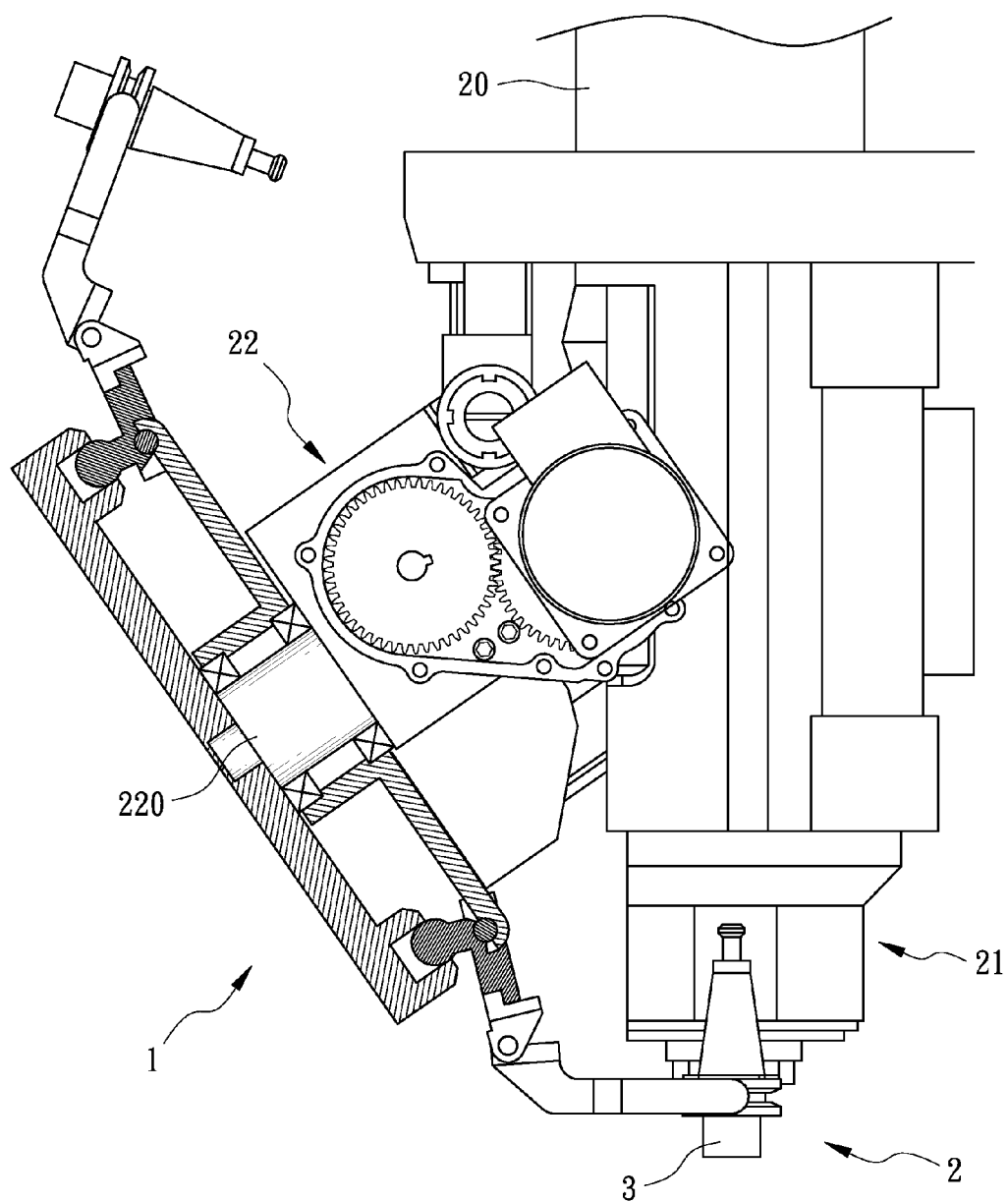
FIG. 1 is a partial, cross-sectional view of a tool machine with a tool magazine according to the preferred embodiment of the present invention.
Figure 2:
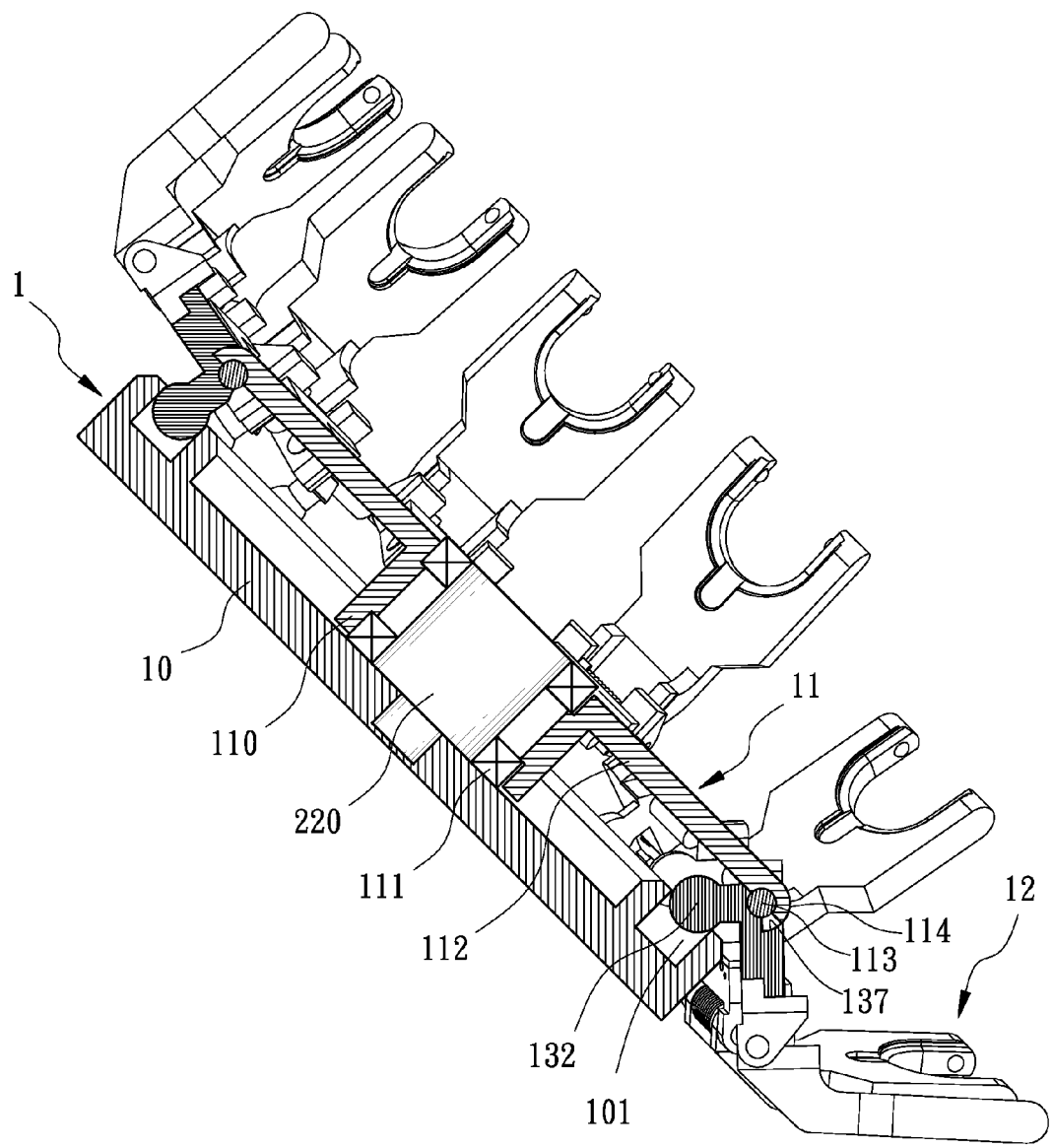
FIG. 2 is a cross-sectional view of the tool magazine shown in FIG. 1.

Referring to FIGS. 1 and 2, a tool machine 2 is equipped with a tool magazine 1 according to the preferred embodiment of the present invention. The tool machine 2 includes a driving unit 20 for driving a spindle 21. Moreover, the tool machine 2 includes a transmission 22 through which the tool magazine 1 is driven by the driving unit 20. The transmission 22 includes an axle 220 formed with a reduced tip. The tool machine 2 will not be further described in detail for being conventional.

The tool magazine 1 includes a guiding plate 10, a turntable 11 and holders 12. The guiding plate 10 is non-rotationally connected to the transmission 22. The turntable 11 is rotationally supported on the guiding plate 10 and operatively connected to the transmission 22. The holders 12 are pivotally connected to the turntable 11.

Figure 3:
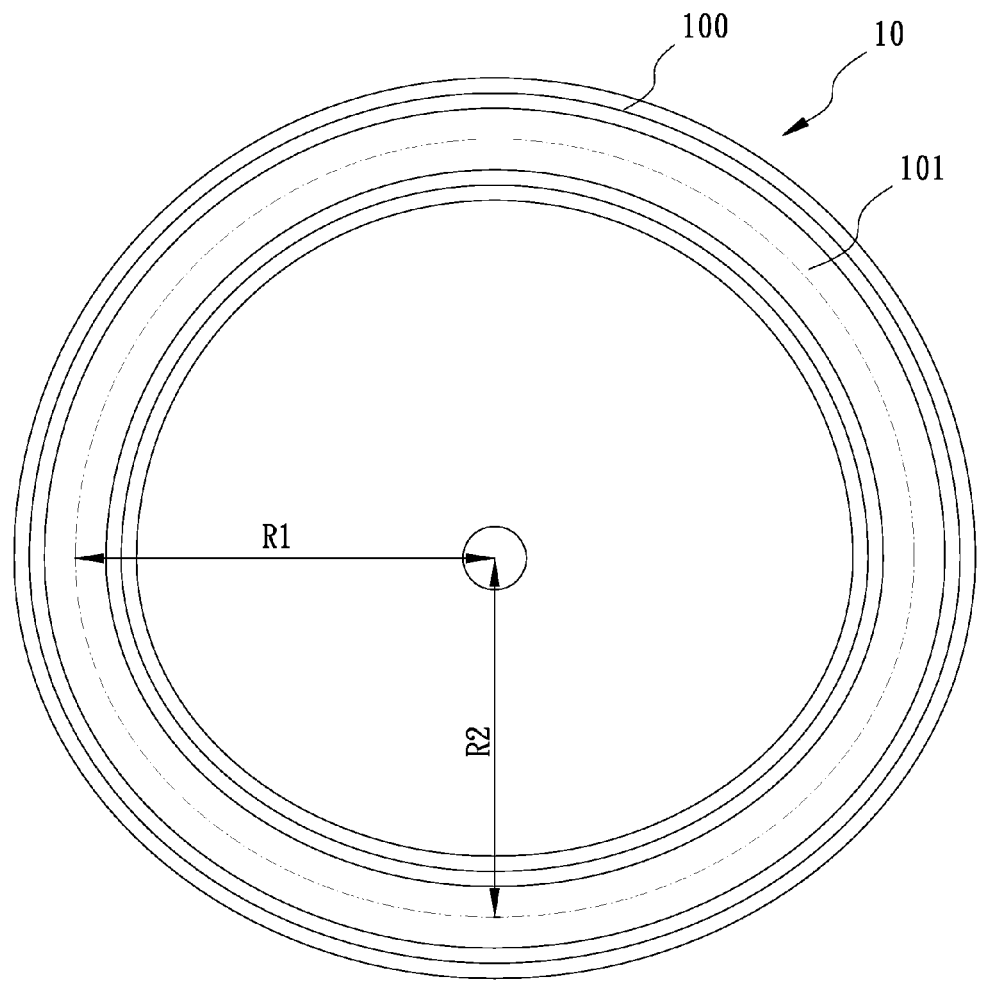
FIG. 3 is a top view of a guiding plate used in the tool magazine shown in FIG. 2.

Referring to FIG. 3 as well as FIGS. 1 and 2, the guiding plate 10 includes an annular ridge 100 formed thereon and an annular groove 101 defined in and along the annular ridge 100. The annular ridge 100 includes first and second sections. Hence, the annular groove 101 includes first and second sections. The first section of the annular ridge 100 extends along half a circle with a radius R1, and so does the first section of the annular groove 101. The second section of the annular ridge 100 extends along half an oval with a semi-major axis R1 and a semi-minor axis R2, and so does the second section of the annular groove 101.

Figure 5:
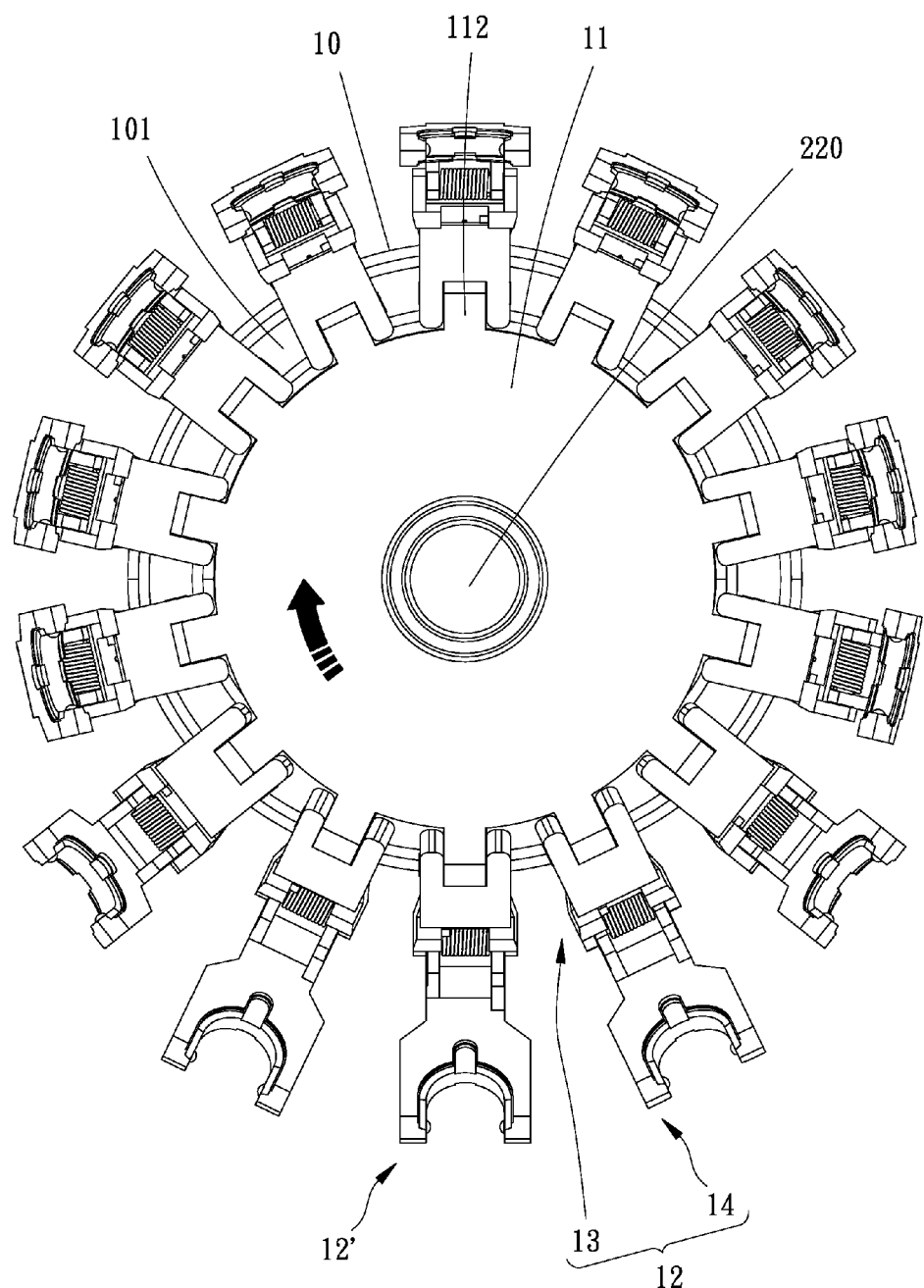
FIG. 5 is a top view of the tool magazine shown in FIG. 2.

Referring to FIGS. 2 and 5, the turntable 11 includes a hub 110 formed at the center and claws 112 extending from the periphery. The claws 112 are identical to one another regarding the length. Each of the claws 112 includes a curled end for holding a pin 113 and a convex face 114 formed thereon at the curled end. The pin 113 includes two ends extending beyond two opposite sides of the related claw 112. The distance between the axis of each of the pin 113 and the axis of the hub 110 of the turntable 11 is shorter than or identical to the semi-major axis R1 but longer than the semi-minor axis R2.

Figure 4:
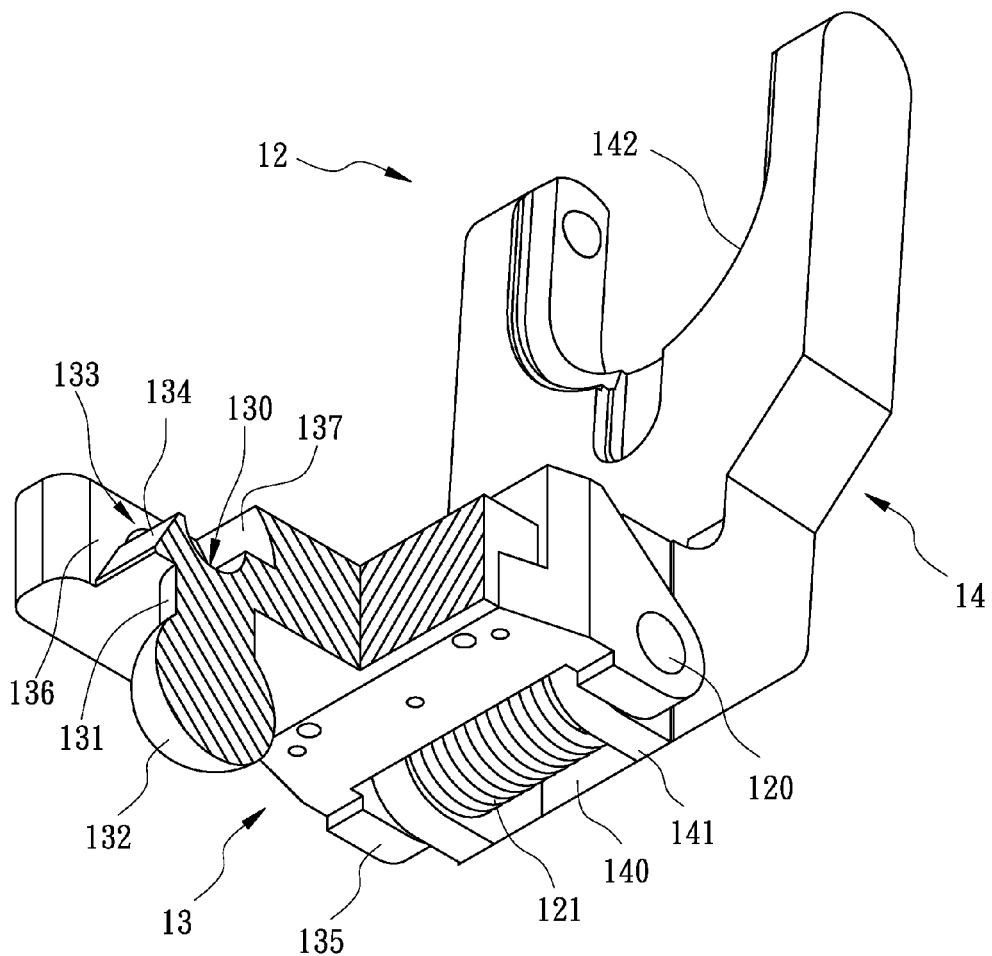
FIG. 4 is a cut-away view of a holder used in the tool magazine shown in FIG. 2.

Referring to FIG. 4 as well as FIG. 2, each of the holders 12 includes a lever 13 for pivotally connecting a fork 14 to a related one of the claws 112. Only one of the holders 12 is shown in an inverted position in FIG. 4. The lever 13 includes a stem 131, a ball 132, a recess 133, a slope 134, two ears 135, two other ears 136 and a concave face 137. The stem 131 extends from a lower face of the lever 13. The ball 132 is formed at the free end of the stem 131. The ears 135 extend from a first end of the stem 131 while the ears 136 extend from a second end of the stem 131 opposite to the first end. Each of the ears 135 includes an aperture defined therein. Each of the ears 136 includes an aperture 130 defined therein. The recess 133 is defined between the ears 136. The slope 134 is formed at the second end of the lever 13. The slope 134 is located between the ears 136 near an open end of the recess 133. The concave face 137 is also formed at the second end of the lever 13. The concave face 137 is located between the ears 136 at a closed end of the recess 133. The concave face 137 is made corresponding to the convex face 114.

The fork 14 includes two ears 141 extending from a first end and two prongs 142 extending from a second end. Each of the ears 141 includes an aperture defined therein. A recess 140 is defined between the ears 141.

In assembly, a torque spring 121 is located in the recess 140 while the ears 141 are located between the ears 135. Preferably, the torque spring 121 is a helical spring, thus defining a tunnel. A pin 120 is inserted through the tunnel defined by the torque spring 121, the apertures defined in the ears 141 and the apertures defined in the ears 135 so that the fork 14 is pivotally connected to the lever 13. The torque spring 121 includes an end in contact with the fork 14 and another end in contact with the lever 13. The fork 14 is retained at about the right angle relative to the lever 13 because of the torque spring 121.

The curved end of each of the claws 112 is located in the recess 133 defined between the ears 136 extending from the second end of a related one of the levers 13. The ends of each of the pins 113 are inserted through the apertures 130 defined in the ears 136 of a related one of the levers 13. Thus, each of the levers 13 is pivotally connected to a related one of the claws 112. The slope 134 of each of the levers 13 is used for contact with a related one of the claws 112 to limit the extent to which the lever 13 can be pivoted relative to the claw 112. The concave face 137 of each of the levers 13 is in contact with the convex face 114 of the related one of the jaws 112 to facilitate smooth pivotal movement of the lever 13 with respect to the jaw 112.

The balls 132 of the levers 13 are movably located in the annular groove 101. Thus, each of the levers 13, the turntable 11 and the guiding plate 10 together form a linkage.

The reduced tip of the axle 220 is inserted in a recess defined in the center of the guiding plate 10. The guiding plate 10 is stationary during the operation. The axle 220 is inclined, i.e., it does not extend horizontally or vertically. Therefore, the guiding plate 10 extends in an inclined plane. The first portion of the guiding plate 10, i.e., the semi-circular portion of the guiding plate 10 is located higher than the second portion of the guiding plate 10, i.e., the semi-oval portion of the guiding plate 10.

The axle 220 is inserted through the hub 110. A bearing 111 is provided between the hub 110 and the axle 220 so that the turntable 11 is rotationally supported on the axle 220. That is, the turntable 11 is rotational during the operation.

Referring to FIGS. 1, 2 and 5, in operation, a tool 3 is held by the fork 14 of each of the holders 12. A tool 3 held by the fork 14 of the related holder 12 is located close to the axle 220 as the ball 132 of the lever 13 of the related holder 12 is located far from the axle 220 when the ball 132 is located in the first section of the annular groove 101. Therefore, the tool 3 is close to the adjacent tools 3.

The tool 3 is located far from the axle 220 as the related ball 132 is located close to the axle 220 when the related ball 132 is located in the second section of the annular groove 101. Hence, the tool 3 is far from the adjacent tools 3. The tool 3 is furthest from the adjacent tool 3 when the related ball 132 is located closest to the axle 220, i.e., in a position corresponding to the semi-minor axis R2. Now, the tool 3 can be maneuvered with a tool exchanger, and such maneuvering will not be interfered with by the adjacent tools 3.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A tool magazine for use in a machine tool, the tool magazine including:
   a guiding plate (10) including an annular groove (101) defined therein, wherein the annular groove (101) includes:
      a semi-circular section defined by a radius (R1); and
      a semi-oval section defined by a semi-major axis (R1) identical to the radius (R1) of the semi-circular section and a semi-minor axis (R2) shorter than the semi-major axis (R1);
   the tool magazine further comprising:
   a turntable (11), including claws (112) extending from a periphery of the turntable; and
   holders (12) each pivotally connected to a related one of the claws (112), wherein each of the holders (12) includes an end for holding a tool (3) and another end formed with a ball (132) movably located in the annular groove (101) so that some of the holders (12), of which the balls (132) are located in the semi-circular section of the annular groove (101), are caused to pivot their respective tools to a position that is closer to a center axle of the turntable, while the other holders (12), of which the balls (132) are located in the semi-oval section of the annular groove (101), are caused to pivot their respective tools to a position that is further away from the center axle of the turntable.

2. The tool magazine according to claim 1, wherein each of the claws (112) is located at distance from a center of the turntable (11) shorter than or identical to the semi-major axis (R1) but longer than the semi-minor axis (R2).

3. The tool magazine according to claim 1, wherein each of the holders (12) includes a fork (14) for holding the related tool (3), and includes a lever (13) for pivotally connecting the respective fork (14) to the related claw (112), wherein each of the balls (132) is formed on a respective one of the levers (13).

4. The tool magazine according to claim 3, wherein each of the levers (13) includes a respective stem (131) extending from a side thereof, wherein the respective ball (132) is formed at a free end of the respective stem (131).

5. The tool magazine according to claim 3, wherein each of the levers (13) includes a respective recess (133) defined therein for receiving the related claw (112).

6. The tool magazine according to claim 5, wherein each of the levers (13) includes a respective slope (134) formed thereon for contact with the related claw (112) located within the respective recess (133), thus limiting the extent to which the related claw (112) can be pivoted relative to the respective lever (13).

7. The tool magazine according to claim 3, wherein each of the claws (112) includes a convex face (114) extending thereon, wherein the lever (13) of each of the holders (12) includes a concave face (137) in contact with the convex face (114) of the related claw (112) to facilitate smooth pivotal movement of the respective lever (13) with respect to the related claw (112).

8. The tool magazine according to claim 3, wherein each of the holders (12) includes a torque spring (121) located between the respective lever (13) and the respective fork (14).

\* \* \* \* \*